Oct. 21, 1924.
J. BOREL
1,512,197
HEAT INSULATING HANDLE
Filed Aug. 17, 1921    2 Sheets-Sheet 1
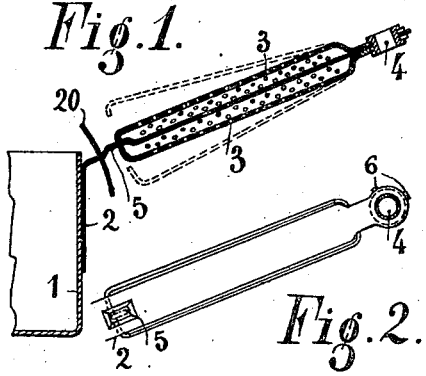
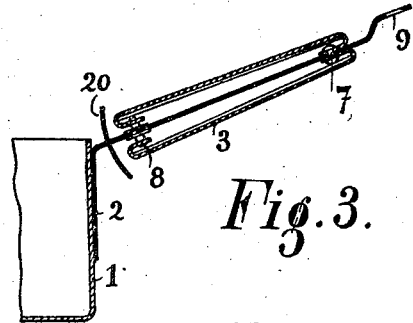
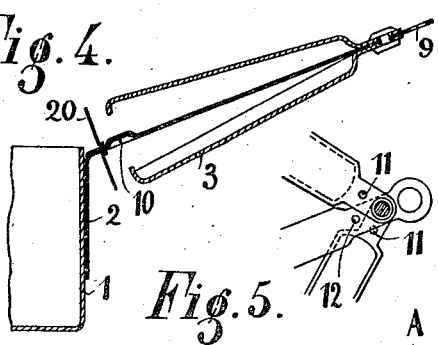
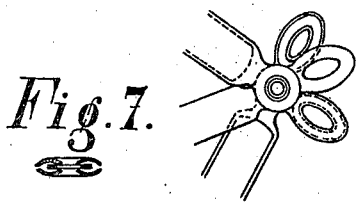
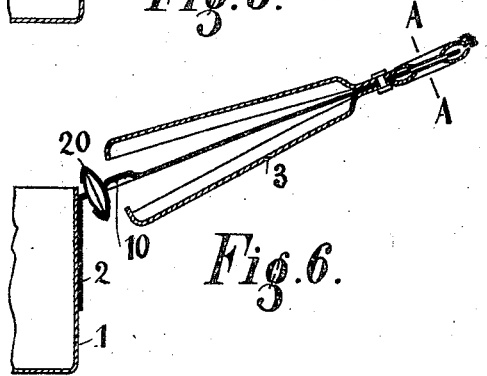
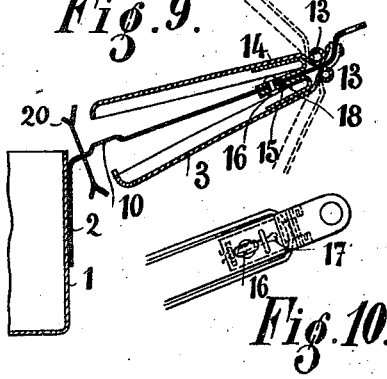
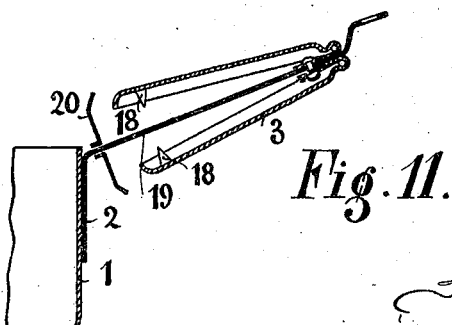
Witnesses:
George Ferge
Roger Raquet
Inventor:
Joseph Borel

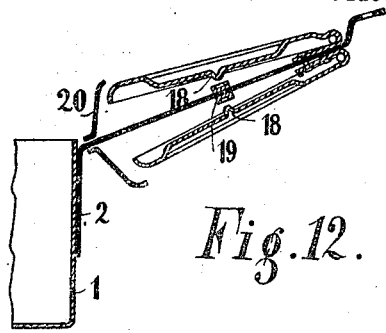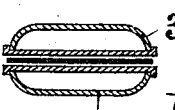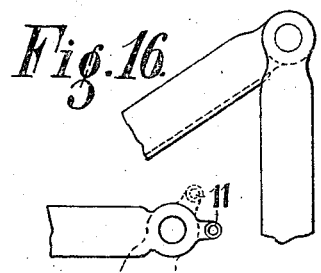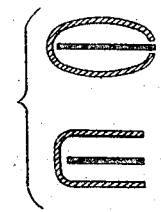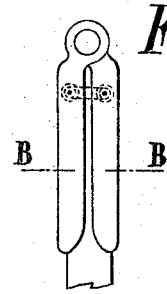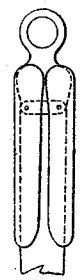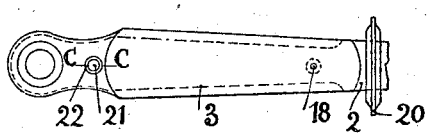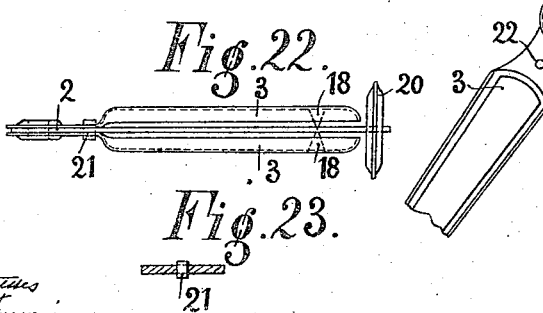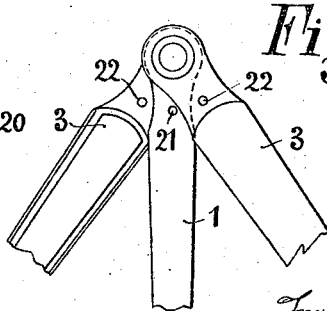

Patented Oct. 21, 1924.

1,512,197

UNITED STATES PATENT OFFICE.

JOSEPH BOREL, OF ANNECY, FRANCE.

HEAT-INSULATING HANDLE.

Application filed August 17, 1921. Serial No. 493,138.

*To all whom it may concern:*

Be it known that I, JOSEPH BOREL, a citizen of the French Republic, residing at Annecy, Haute Savoie, France, have invented certain new and useful Improvements in Heat-Insulating Handles, of which the following is a specification.

Up to now it has been attempted to arrange the handles of saucepans and other kitchen utensils, so that they do not conduct the heat, by the insertion of heat insulating substances.

Insulation obtained by these various means has not been very good, as the insulating substances are not sufficiently thick to stop the transmission of heat in an efficacious manner.

Moreover the materials employed are as a rule sensitive to heat which softens, hardens, or decomposes them, while the moisture also acts on them. Moreover, the handles are often hollow and cannot generally be dismantled so that it is difficult to clean them inside, and it is impossible to avoid the decomposition of any substances that have entered them during the washing.

When the parts are all detachable, they become separated and liable to be easily lost or badly replaced.

In considering a saucepan placed on the fire, it is easy to see how its handle becomes heated; (1) by conductivity, heat taken from the receptacle or container itself, and varying with the temperature of the liquid. (2) By contact with the hot gases of the fire which surround the saucepan and rise round it, and more particularly round the handle which offers an obstacle to their ascent. (3) By contact with the steam which is projected against the handle when the saucepan is closed by a lid.

It is therefore necessary to avoid heating by conductivity as well as at the same time by contact with gases and steam.

The device shown in the accompanying drawing and hereinafter described affords a remedy for the above in the following manner:

The heating by conductivity is prevented by a protective covering surrounding the handle, and the heating by contact—by a shield of a very variable shape, mounted in front of the covering on the handle itself.

A method of locking the covering, enables it to be held in fixed position during use.

The handle which is a combination of these various means, is shown in several constructions in the accompanying drawing by way of example.

Figure 1 is an elevation of a saucepan provided with the two means of protection, Figure 2 is a plan of the handle, Figure 3 shows a modified method of fixing and locking the covering constituting the handle, and a modified construction of the shield.

Figure 4 shows another modified method of attaching the covering and a modified shape of the shield.

Figure 5 shows a method of adjusting the covering.

Figure 6 a new shape of the rear part and of the shield.

Figure 7 a section on the line A—A of Figure 6.

Figure 8 shows the covering open for cleaning.

Figures 9 and 10 are respectively a section and plan of a modified construction of the covering and shield.

Figure 11 is a view of a modified construction with points for locking the core of the handle by the covering.

Figure 12 a section showing another method of locking the core of the handle by the covering.

Figure 13 shows in section the covering filled with a non-conducting material.

Figure 14 shows the covering simply closed at its base.

Figure 15 shows a modified arrangement of the locking tappets.

Figure 16 shows a covering in one piece closing on the core of the handle.

Figure 17 shows in section several shapes that could be given to the said covering.

Figure 18 shows a new method of holding the covering with a catch.

Figure 19 is a section on the line B—B of Figure 18.

Figure 20 is a modified construction of the device shown in Figure 18,

Figure 21 is a plan of the handle the two part covering closed or turned down on it.

Figure 22 is a side elevation in the same position.

Figure 23 is a section on the line C—C of Figure 21 showing the position of the pin.

Figure 24 shows the handle in plan, the two part covering being open for cleaning.

Figures 21–24 show more particularly the method of locking the covering.

In said figures—

1 is the body of the saucepan or container provided with a handle 2 secured to the said body in any desired manner, 3 are the metal coverings, with or without perforations, secured at 4 by a rivet forming the loop for the hooking up, 5 is a recess stamped out in the handle, with which engage the ends of the two coverings, 6 are two stop blocks for regulating the putting in place.

The coverings may pivot about the rivet 4 as an axis, this facilitating the cleaning of the interior of the coverings. The dotted lines in Figure 1 show them moved away from their normal position. The full lines show the position of the coverings brought together and locked on the handle 2 in their normal position.

When the saucepan is on the fire, the heat rises by conduction to the rivet 4, the only point of contact between the handle and the coverings, it then passes into the coverings 3 where, finding a large radiation area, increased by the perforations, it is lost by radiation. There is moreover a continuous circulation of the air through the perforations of the shells surrounding the handle. Moreover a large portion of the said heat has been intercepted during its passage, and radiated by the shield 20.

When the saucepan is grasped, the hand exercises a sufficient pressure on the coverings to press them against the handle where they engage with the recesses provided in the handle in the construction shown in Figures 1 and 2. Moreover the coverings cannot swing being held in the recess 5.

In the construction shown in Figure 3, the coverings 3 are bent over and secured by means of a small rivet 7. 8 is a guide nipple provided for maintaining properly the ends of the coverings. The holes provided in the coverings for the passage of the guide nipple 8, are large enough to avoid any contact.

In place of a guide nipple, a hollow or recess may be stamped out in the handle 2, and nipples in the coverings 3. 9 is the ring for suspending the saucepan.

Figure 4 shows the device just mentioned, in which a recess 10 has been stamped out. Figure 5 shows small spigots 11 and 12 stamped out of, or secured to the handle or coverings and enabling the latter to be put in the exact position relatively to the handle.

In Figures 6–8, the coverings are extended towards the suspension ring and given its shape by which arrangement they may be easily kept in place relatively to the handle, and avoids the use of the spigots 11 and 12 shown in Figure 5.

In Figure 9, the coverings are mounted on hinges 13, and are held in position by a spring 14, a lower spring 15 with an oval hole for surrounding a button 16, the whole being secured by a small U shaped spring 17 (Figure 10) passing through a guide 18. By slightly forcing the coverings, they may be opened completely whereby they may be cleaned.

In the device shown in Figure 11, the coverings 3 are provided inside with points 18 which during the closure engage with recesses 19 provided in the handle. The springs 14 are done away with, the covering itself forming a spring.

In Figure 12, the points 18 are stamped out of the coverings and the recess is stamped out of or secured to the handle 2.

Figure 13 shows in cross-section the coverings closed and filled, with a non-conducting material.

Figure 14 shows the same coverings empty, but closed at their interior part.

Figure 15 shows a modified arrangement of the nipples 11 for locking.

Figure 16 shows a modified construction of the coverings, in one piece and surrounding almost completely the handle 2 which it closes on and envelopes it.

Figure 17 shows in section two shapes that might be given to the covering shown in Figure 16.

In Figures 18–20 is shown a method of holding the coverings by means of a latch with a snap blade.

Figures 21–24 show a very simple method of locking the coverings.

This locking is obtained by means of a small pin 21 secured to the handle 2 of the saucepan and caused to penetrate or not, at will, into a hole or recess 22 provided in the coverings 3, which may easily be done in view of their comparative resiliency.

18 are the points as in Figure 11, which can be used with or without the small pin 21.

All these shapes of coverings, may evidently be varied ad infinitum, applied singly or in combination with each other to any household and kitchen articles, in which the transmission of heat is to be feared or to be avoided for the purpose of facilitating the manipulation of the said articles.

What I claim as my invention and desire to secure by Letters Patent is:—

1. A heat insulating handle device for household or kitchen utensils comprising a metallic handle adapted to be secured to the utensil and an upper and a lower shallow dish-like metal covering plate pivotally secured to the said handle at one end thereof, the said covering plates opening about their pivot for the purpose of cleaning.

2. A heat insulating handle device for kitchen or household utensils comprising a metallic handle adapted to be secured to the utensil and an upper and a lower shallow dish-like metal covering plate pivotally secured to the said handle at one end thereof and means for engaging the free ends of the said plates with the handle.

3. A heat insulating handle device for kitchen or household utensils comprising metal covering plates pivotally secured to the handle at the end which is farthest away from the utensil, a shield between the said covering plates and the utensil, and means for engaging the free ends of the said plates with the handle.

4. A heat insulating handle device for household or kitchen utensils comprising a metallic handle adapted to be secured to the utensil, upper and lower shallow dish-like metal covering plates pivotally secured to the handle at one end thereof and parts on the said plates adapted to co-act with a stamped-up part on the handle to retain the said plates in correct position above and below the handle when the device is gripped.

5. A heat insulating handle device for household or kitchen utensils comprising a metallic handle adapted to be secured to the utensil, upper and lower shallow dish-like metal covering plates pivotally secured to the handle at one end thereof and projections on the said plates adapted to co-act with recesses to retain the said plates in correct position above and below the handle when the device is gripped.

6. A heat insulating handle device for household or kitchen utensils comprising a metallic handle adapted to be secured to the utensil, upper and lower shallow dish-like metal covering plates pivotally secured to the handle at one end thereof and projections on the said plates adapted to co-act with recesses provided in blocks mounted on the handle to retain the said plates in correct position above and below the handle when the device is gripped.

In testimony whereof I have signed my name to this specification in the presence of two subscribing witnesses.

JOSEPH BOREL.

Witnesses:
MARTINET, L.,
CYRUS B. FELLMER.